Figures 1, 2, 3, 4:
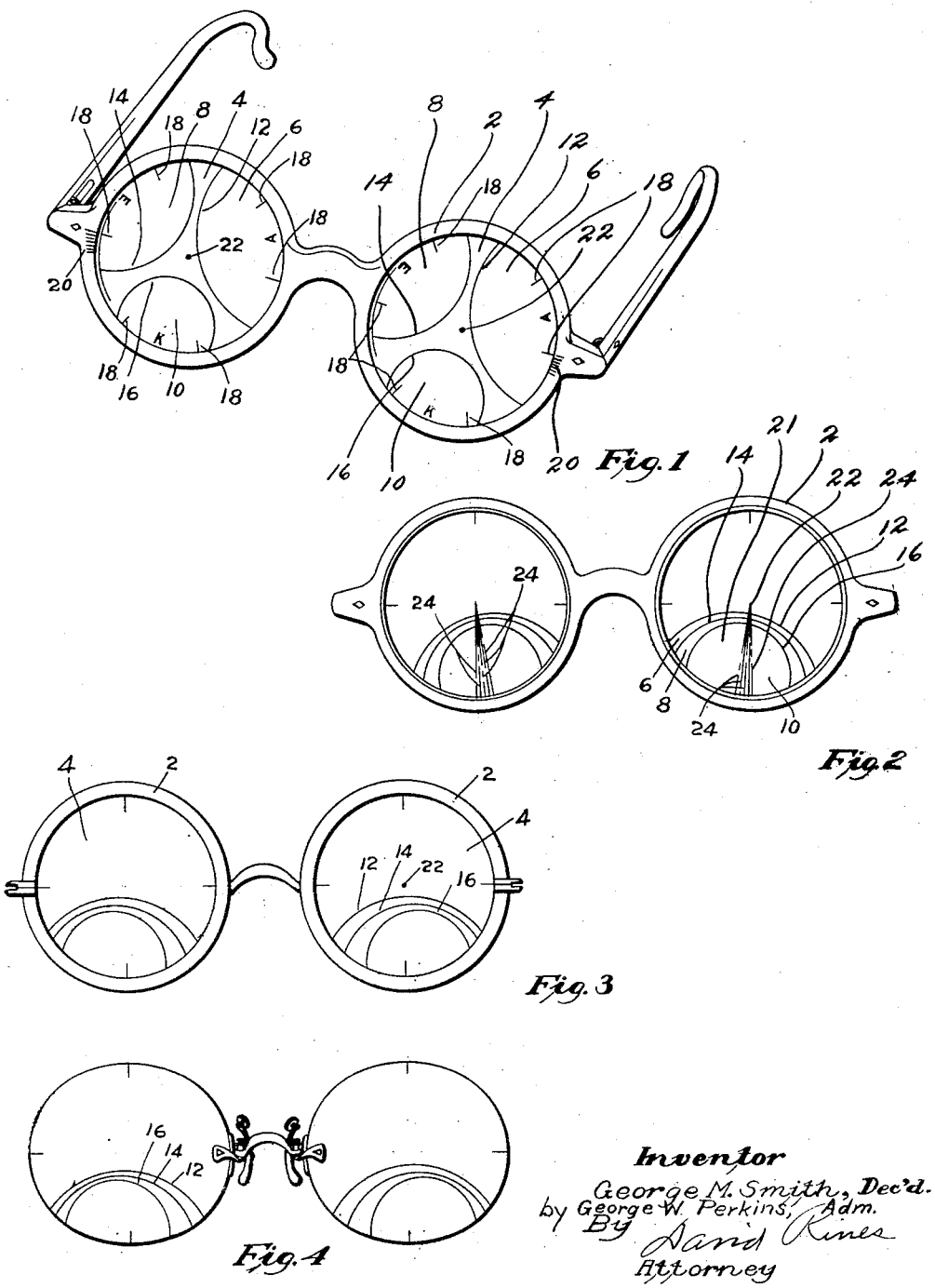

March 18, 1930.  G. M. SMITH  1,750,731

BIFOCAL FITTING DEVICE

Filed June 25, 1925

Inventor
George M. Smith, Dec'd.
by George W. Perkins, Adm.
By David Rines
Attorney Patented Mar. 18, 1930

1,750,731

UNITED STATES PATENT OFFICE

GEORGE M. SMITH, DECEASED, LATE OF ARLINGTON, MASSACHUSETTS, BY GEORGE W. PERKINS, ADMINISTRATOR, OF EVERETT, MASSACHUSETTS, ASSIGNOR TO BAUSCH & LOMB OPTICAL COMPANY, OF ROCHESTER, NEW YORK, A CORPORATION OF NEW YORK

BIFOCAL FITTING DEVICE

Application filed June 25, 1925. Serial No. 39,509.

The present invention relates to devices for fitting patients with ophthalmic mountings, and more particularly for fitting bifocal lenses.

Unless the bifocal wafer of a bifocal lens is properly positioned relatively to the pupil of the wearer's eye, it causes great annoyance, and the glasses are sometimes worse than no glasses at all. A number of devices have been proposed for properly positioning the bifocal wafer, but they are either too complicated or too clumsy for practical use. Opticians, therefore, still fit the wafers largely by guess work. The consequent discomfort is very great, and in a large percentage of cases, the lenses must be thrown away and replaced by others that fit better.

A chief object of the invention is to enable the optician, by simple means and with a minimum of trouble, to position the bifocal wafer accurately to the wearer's eye convergence and at the proper distance below the pupil's normal position, or the position occupied by the pupil for distance vision. Other and further objects will appear hereinafter, and will be specified in the appended claims.

In the accompanying drawings, Fig. 1 is a perspective view illustrating the invention in preferred form, and Figs. 2, 3 and 4 are views of modifications.

According to the present invention, a lens mounting or frame 2 is mounted upon the wearer's face and the position of the bifocal wafer corresponding to the pupil of the wearer's eye is determined by inspection upon a lens 4 mounted on the mounting 2. The term "lens", as used in the specification and claims, is intended to cover any transparent medium placed before the eye. The lens 4 is provided with three imitation bifocal wafers or reading portions 6, 8 and 10, as illustrated in Fig. 1, the imitation wafers being marked out upon the lens by lines 12, 14 and 16, respectively. It will be understood that the lines 12, 14 and 16 do not, as in ordinary bifocal lenses, separate regions of different magnification of the lens 4, but that they are mere arbitrary markings upon a lens 4 having the same magnification both on the bifocal wafers and on the adjacent body portions of the lens. The present invention does not depend for its operability upon any particular degree of magnification of the lens 4, whether high or low or even zero. The lines 12, 14 and 16 may be etched upon the lens, or may be marked thereon in any other desired manner. The bifocal wafers 6, 8 and 10 are spaced along the circumference of the lens 4. The bifocal wafers 6, 8 and 10 correspond in size and shape to three types of wafers upon the market. This, however, is not essential, for the lines 12, 14 and 16, may, for example, be straight lines, or they may consist of other markings. It is desirable to have these lines at different distances from the center 22 of the lens.

A plurality of indices 18, spaced along the circumference of the lens 4, are adapted to cooperate with one or more indices or graduations 20 provided at any suitable position upon the mounting 2, as at the end pieces. The indices 18 may be brought into cooperative relation with the graduations 20 by rotating the lens 4 in the mounting 2.

In operation, after the mounting 2 has been placed upon the wearer's face, the lens 4 is first rotated in the mounting 2 until the desired wafer 6, 8 or 10 is swung opposite to the pupil of the wearer's eye when converged. The lens is then further rotated slightly in one direction or the other until the pupil convergence is accurately matched. To this end, each imitation wafer may be provided with a dot or other index at its center, though this is not necessary. The desired angular position may be read by means of one of the indices 18 and the graduations 20. This, however, is not enough. It is further necessary to indicate the distance of the top of the wafer 6, 8 or 10, as the case may be, below the center 22 of the lens. The pupil will be positioned opposite the center 22 for distance vision. This may be done by again rotating the lens until it is determined which of the three lines 12, 14 and 16 is properly positioned below the pupil when the latter is centered for distance vision. The usual distance of the top of the wafer below the normal position of the eye, or below the center 22, is between two and three millimeters, but this may be varied, as may be necessary. Both the eye convergence and the position of the wafer below the pupil are thus determined at a mere glance.

The same result may be obtained without rotating the lens by using one of the devices illustrated in Figs. 2, 3, and 4. The lines 12, 14 and 16 are, in this case, nested one within the other, thus facilitating the reading of the proper distance, below the normal position of the pupil, of the desired bifocal wafer. To aid the optician, the lines may be marked in different colors, or in some other distinguishing manner. In Fig. 2, the wafers are arranged concentrically, and the angular position of the desired wafer may be read by means of a plurality of indices 24. The indices 24, in the illustrated embodiment of the invention, consist of a plurality of lines diverging from the center 22 of the lens toward the circumference of the lens. It is not necessary that the lines 24 diverge, for they may be otherwise arranged, as parallel. The angle of the desired bifocal wafer may be determined at a mere glance, to see which of the lines 24 is opposite the pupil of the eye.

In Figs. 3 and 4, the lines 12, 14 and 16, though nested one within the other, are not concentrically arranged as in Fig. 2, but are displaced from concentric position. The use of indices is therefore not necessary, for the pupil's convergence may be estimated by comparing it with the center of the wafer that most nearly matches the pupil. The centers of the wafers may be marked with dots, or in any other way, if desired, and the dots may be marked with different colors, to correspond to the colors of the lines 12, 14 and 16 of the wafers.

In Figs. 1 and 2, the frame is shown as of the all-shell type. In Fig. 3, the frame is of the split-rim type; and in Fig. 4 a rimless mounting is illustrated, in which the lenses are elliptical, rather than circular. It will be understood that rotatable lenses may be used in the mountings of Figs. 2 and 3 and stationary lenses in Fig. 1, if desired.

According to the present invention, therefore, very simple means is provided for enabling the optician to determine accurately, at a glance, where the bifocal wafer of a bifocal lens should be placed before the wearer's eye, and also what type or style of wafer is most suitable for the particular wearer.

It will be understood that the invention is not limited to the exact embodiments thereof that are herein illustrated and described, but modifications may be made by persons skilled in the art without departing from the spirit of the invention, the scope of which is defined by the appended claims.

What is claimed is:

1. A bifocal fitting device comprising a fitting lens having a plurality of imitation bifocal wafers of different types marked therein in nested relation.

2. A bifocal fitting device comprising a fitting lens having a plurality of imitation bifocal wafers of different types marked thereon concentrically in nested relation.

3. A bifocal fitting device comprising a fitting lens having an imitation bifocal wafer marked thereon and an index associated with the wafer.

4. A bifocal fitting device comprising a fitting lens having a plurality of imitation bifocal wafers marked thereon and differently related to the center of the lens and a plurality of indices associated with the wafers.

5. A bifocal fitting device comprising a fitting lens having a plurality of imitation bifocal wafers marked thereon in nested relation and a plurality of indices associated with the wafers.

6. A bifocal fitting device comprising a fitting lens having a plurality of imitation bifocal wafers marked thereon concentrically in nested relation and a plurality of indices associated with the wafers.

7. A bifocal fitting device comprising a fitting mounting and a fitting lens mounted on the mounting having a plurality of imitation bifocal wafers of different types marked on the lens in nested relation.

8. A bifocal fitting device comprising a fitting mounting and a fitting lens mounted on the mounting having an imitation bifocal wafer marked on the lens, the device being provided with an index.

9. A bifocal fitting device comprising a fitting mounting and a fitting lens mounted on the mounting having a plurality of imitation bifocal wafers marked on the lens, the device being provided with a plurality of indices.

10. A bifocal fitting device comprising a fitting mounting, and a fitting lens mounted on the mounting having a plurality of imitation bifocal wafers of different types marked on the lens in nested relation, the device being provided with a plurality of indices.

11. A bifocal fitting device comprising a fitting lens adapted to be mounted upon the face of a wearer, the fitting lens having an imitation bifocal wafer marked thereon, and means for determining the angular position of the wafer corresponding to the wearer's eye convergence.

12. A bifocal fitting device comprising a fitting lens adapted to be mounted upon the face of a wearer, the fitting lens having a plurality of imitation bifocal wafers of different types marked thereon, and means for measuring the angular position of the wafers corresponding to the wearer's eye convergence.

13. A bifocal fitting device comprising a fitting lens having an imitation bifocal wafer marked thereon, the fitting lens having the same magnification both in the wafer and the adjacent body portion of the lens.

14. A bifocal fitting device comprising a fitting lens having a plurality of imitation bifocal wafers marked thereon and differently related to the center of the lens, the fitting lens having the same magnification both in the wafers and the adjacent portions of the lens.

15. A bifocal fitting device comprising a fitting mounting, and a fitting lens mounted on the mounting and having an imitation bifocal wafer marked on the lens, the fitting lens having the same magnification both in the wafer and the adjacent body portion of the lens.

In testimony whereof, I have hereunto subscribed my name.

G. W. PERKINS,
*Administrator of the Estate of George M. Smith, deceased.*